April 21, 1970 E. RABE 3,507,502

SOUND REPRODUCING APPARATUS

Filed Jan. 10, 1968 2 Sheets-Sheet 1

INVENTOR
ERICH RABE
BY Michael S. Striker
ATTORNEY

SOUND REPRODUCING APPARATUS

Filed Jan. 10, 1968 2 Sheets-Sheet 2

INVENTOR
ERICH RABE

BY his ATTORNEY

United States Patent Office 3,507,502
Patented Apr. 21, 1970

3,507,502
SOUND REPRODUCING APPARATUS

Erich Rabe, Nuremberg, Germany, assignor to Schildkrot AG Vorm, Rheinische Gummi- und Celluloid-Fabrik, Mannheim-Neckarau, Germany Continuation-in-part of application Ser. No. 591,303, Nov. 1, 1966. This application Jan. 10, 1968, Ser. No. 696,925
Claims priority, application Germany, June 2, 1967, Sch 40,820
Int. Cl. G11b *15/40, 15/44*
U.S. Cl. 274—9 20 Claims

ABSTRACT OF THE DISCLOSURE

The needle of the tone arm in a sound reproducing apparatus is automatically disengaged from the terminal portion and returned into registry with the lead-in portion of the sound groove in a record carrier in response to a reversal in the operation of the motor which drives the record carrier. The motor may be a spring motor or an electric motor and the resetting unit which can disengage the needle from the record carrier comprises a lever which lifts the tone arm off the record carrier when it is pivoted by the motor through the intermediary of a cam. A spring then shifts the needle back into registry with the lead-in portion of the sound groove. When the motor begins to operate normally in order to drive the record carrier, the needle is automatically returned to engagement with the lead-in portion of the sound groove. The spring motor can be energized by a drawstring and the operation of the electric motor may be reversed by a built-in or remote-control switching device.

CROSS-REFERENCE TO RELATED APPLICATION

This is a continuation-in-part of my copending application Ser. No. 591,303, filed Nov. 1, 1966, for "Sound Reproducing Apparatus," now Patent No. 3,452,991

BACKGROUND OF THE INVENTION

The present invention relates to sound reproducing apparatus in general, and more particularly to improvements in sound reproducing apparatus wherein the needle of a tone arm is arranged to repeatedly track a sound groove in a disk-shaped or like record carrier to reproduce a single sound sequence or a series of sound sequences. In such sound reproducing apparatus, the needle must be reset upon completed reproduction of a single sound sequence or a series of sound sequences so that it returns into accurate registry with the lead-in portion of the sound groove. Furthermore, it is often desirable to automatically return the needle into engagement with the sound groove so that the operator need not not touch the tone arm in order to bring about repeated reproduction of sound.

SUMMARY OF THE INVENTION

It is an important object of my invention to provide a simple, compact and inexpensive sound reproducing apparatus, for example, a sound reproducing apparatus adapted for use in talking dolls or other types of toy devices, which can reproduce a single sound sequence or a series of sound sequences.

Another object of the invention is to provide a sound reproducing apparatus which comprises a small number of simple parts and wherein the resetting of tone arm can take place in automatic response to normal manipulation of the apparatus, particularly in response to manipulation of the drive which rotates the record carrier during reproduction of sound.

A further object of the invention is to provide a novel resetting unit which can be used in the above outlined sound reproducing apparatus to reset the needle of the tone arm in automatic response to preparation of the apparatus for renewed reproduction of one or more sound sequences.

An additional object of the invention is to provide a novel motion transmitting connection between the prime mover of the sound reproducing apparatus and the tone arm.

Still another object of the invention is to provide a novel prime mover which can be used in a sound reproducing apparatus of the above outlined character.

An ancillary object of the invention is to provide a sound reproducing apparatus wherein resetting of the needle and its reengagement with the record carrier take place automatically in response to carrying out of steps which are necessary to prepare the apparatus for renewed reproduction of one or more sound sequences.

Briefly outlined, my invention is embodied in a sound reproducing apparatus which comprises a frame, a record carrier rotatably supported by the frame and having in its exposed surface a sound groove with a lead-in portion located at a first distance and a terminal portion located at a second distance from the axis of the record carrier, a tone arm movably mounted on the frame and having a needle which can track the sound groove from the lead-in portion to the terminal portion to reproduce one or more sound sequences, reversible drive means arranged to drive the record carrier while operating in a first direction and lifting means arranged to disengage the needle from the sound groove in response to operation of the drive means in a second direction.

The drive means may include a spring motor or an electric motor, and the lifting means preferably comprises a lever which receives motion from a cam driven by the motor when the latter is operated in the second direction whereby the lever disengages the needle from the record carrier. A resetting spring can be provided to return the needle into registry with the lead-in portion of the sound groove.

The novel features which are considered as characteristic of the invention are set forth in particular in the appended claims. The improved sound reproducing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
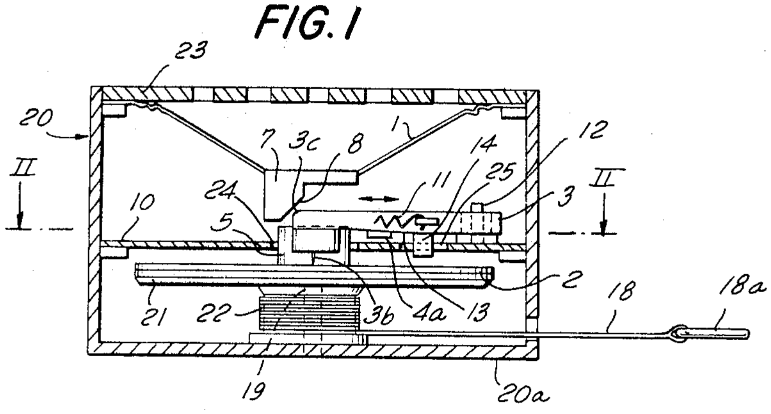
FIG. 1 is a transverse vertical sectional view of a sound reproducing apparatus which embodies one form of my invention and wherein the record carrier is driven by a spring motor.
Figure 2:
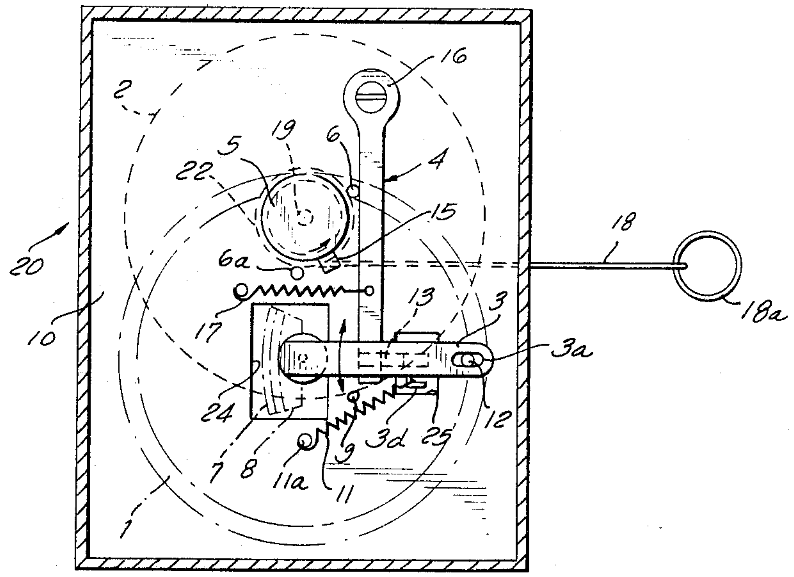
FIG. 2 is a horizontal section as seen in the direction of arrows from the line II—II of FIG. 1.

FIGS. 1 and 2 show a sound reproducing apparatus which comprises a substantially tray-shaped housing or frame 20 having a bottom wall 20*a* which supports the shaft 19 of a turntable 21 for a disk-shaped record carrier 2. The turntable 21 is operatively connected with a prime mover constituted by a spring motor and including a reversible reel 22 connected with one end of an energizing element in the form of a drawstring 18 having at its outer end an annular handle 18*a* which can be pulled by hand to energize the motor. The reel 22 can rotate in two directions. The interior of the reel 22 accommodates a customary torsion spring which stores energy during extraction of the drawstring 18 and rotates the turntable 21 and record carrier 2 when the handle 18*a* is released. The spring motor is arrested when the handle 18*a* reaches the outer side of the housing 20. Shaft 19 is preferably rigidly connected with the reel 22 and record carrier 2.

The housing comprises a partition 10 which extends transversely across the space above the record carrier 2 to serve as a support for a tone arm 3 and is located at a level below a loudspeaker diaphragm 1. The latter is connected to a perforated top wall 23 of the housing 20. The central portion or base of the diaphragm carries a specially configurated substantially wedge-like contact element 7 having an inclined contact face 8 which is engaged by the tone arm 3 during reproduction of sound to transmit vibrations to the diaphragm. In the illustrated embodiment, the plane of the contact face 8 and the exposed surface of the record carrier 2 are inclined with reference to each other and make an angle of about 45 degrees. However, it is equally possible to provide the element 7 with a contact face whose inclination is more pronounced or less pronounced. It was found that an angle of 45 degrees is very satisfactory. The inclined contact face 8 extends along an arc (see FIG. 2) whose center of curvature is located on the axis of a pivot pin 12 for the tone arm 3. The pivot pin 12 is mounted on the partition 10 and extends into an elongated guide slot 3*a* of the tone arm so that the latter can reciprocate in a direction substantially radially toward and away from the axis of the diaphragm 1. The radius of curvature of the arcuate contact face 8 equals the effective length of the tone arm 3. It is further to be noted that the length of the contact face 8 exceeds the distance between the outermost and innermost sound grooves in the exposed upper surface of the record carrier 2. Such sound grooves may form a continuous helix or a series of concentric helices each of which has a lead-in portion located at a maximum distance and a terminal portion located at a minimum distance from the axis of the shaft 19. In this way, the needle or stylus 3*b* of the tone arm 3 can track an entire sound groove but remains in requisite engagement with the contact face 8. The tone arm 3 is further provided with an inclined contact face 3*c* which is movable into and away from engagement with the contact face 8 on the element 7. The contact face 3*c* is provided at that end of the tone arm 3 which carries the needle 3*b*.

The underside of the tone arm 3 (namely, that side which is turned toward the grooved surface of the record carrier 2) is provided with a sloping cam surface or ramp 13 one end of which is adjacent to a stop 14. The stop 14 is provided at that (lowermost) end of the cam surface 13 which is located at a maximum distance from the contact face 8 and needle 3*b*.

The cam surface 13 cooperates with a lifting unit serving to move the tone arm 3 upwardly and away from the sound groove of the record carrier 2 so that the needle 3*b* can be disengaged from the carrier and the tone arm can change its angular position to return the needle to a starting position, namely, into registry with the outermost convolution of the sound groove. The lifting unit comprises a lifting member here shown as a lever 4 which is turnable on a pivot 16 secured to the partition 10 and is biased by a helical contraction spring 17 so that it normally abuts against a fixed arresting pin 6 provided on the partition 10. The free end portion 4*a* of the lever 4 constitutes a follower which can slide along the cam surface 13 in a direction toward the stop 14 whereby the tone arm 3 is first tilted about the pin 12 and is thereupon caused to move its face 3*c* away from the face 8 on the contact element 7. The lever 4 is held against flexing because it is slidable along the upper side of the partition 10. However, it is clear that the lever 4 may be sufficiently rigid and that its free end portion 4*a* need not be supported by the partition 10. This partition further supports a rotary motion transmitting cylindrical cam 5 which is coaxial with the shaft 19 for the turntable 21. The cam 5 is coupled to the reel 22 by a friction clutch 5*a* so that it rotates with the reel only to the extent determined by the arresting pin 6, by a second arresting pin 6*a* (mounted on the partition 10), and by a radially outwardly extending projection or lobe 15 disposed between the arresting pins 6, 6*a* and affixed to or integral with the periphery of the cam 5.

A helical contraction spring 11 is connected to a median portion of the tone arm 3 and to a post 1*a* on the partition 10. The purpose of the spring 11 is to urge the needle 3*b* to a starting position in which the latter is located at a maximum distance from the shaft 19 and registers with the outermost convolution of the sound groove in the record carrier 2. The tone arm 3 is provided with a hooked spring retainer 3*d* which is connected with one end convolution of the spring 11. FIG. 2 shows clearly that the spring 11 also tends to shift the tone arm 3 in a direction to the left, i.e., toward the inclined contact face 8.

Figure 3:
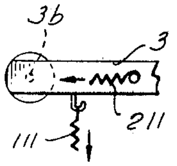
FIG. 3 is a fragmentary top plan view of a detail of a second sound reproducing apparatus whose tone arm is biased by two springs.

As illustrated in FIG. 3, the tone arm 3 can be biased by two springs which replace the spring 11. The spring 111 urges the needle 3*b* in a direction radially of the record carrier 2 and away from the shaft 19. The spring 211 biases the tone arm 3 in a direction toward the face 8 of the contact element 7. The construction of FIG. 3 will be preferred in such sound reproducing apparatus wherein the tone arm 3 is to be subjected to more uniform bias, not only in a direction radially of the record carrier 2 but also in the longitudinal direction of its guide slot 3*a*. The spring 111 acts in a direction substantially at right angles to the longitudinal direction of the tone arm 3 and the spring 211 acts in a direction which is substantially parallel with such longitudinal direction.

During reproduction of sound, the record carrier 2 rotates in a clockwise direction, as viewed in FIG. 2. The contact face 8 slopes toward the exposed grooved surface of the carrier 2, as seen in the direction of such rotation.

When the reproduction of a sound sequence is completed, the handle 18*a* engages the outer side of the housing 20 and the record carrier 2 is arrested while the needle 3*b* extends into the innermost convolution (or one of the innermost convolutions) of the sound groove in the exposed surface of the record carrier 2. If the operator thereupon exerts a pull on the handle 18*a* in a direction to withdraw the drawstring 18 to extended position, the reel 22 rotates in response to unwinding of the drawstring and the aforementioned torsion spring of the spring motor stores energy. The reel 22 then rotates in a direction counter to that necessary to drive the record carrier 2 in a clockwise direction. The cam 5 shares such rotation of the reel 22 (in a counterclockwise direction, as viewed in FIG. 2) until the lobe 15 reaches the arresting pin 6. From then on, the friction clutch 5*a* allows the reel 22 to rotate with reference to the cam 5. However, on its way toward engagement with the arresting pin 6, the lobe 15 rocks the lever 4 of the lifting device in a counterclockwise direction, as viewed in FIG. 2, whereby the free end portion or follower 4*a* of the lever slides along the cam surface 13 and moves the needle 3*b* of the tone arm 3 upwardly and away from the innermost sound groove in the record carrier 2. Once the free end portion 4*a* of the lever 4 reaches the stop 14 and the lobe 15 continues to rock this lever in a counterclockwise direction, the latter entrains the tone arm 3 in a direction to move the contact face 3*c* away from the contact face 8 whereby the slot 3*a* moves with reference to the pin 12 until the latter abuts against the leftmost portion of the surface bounding the slot 3*a*. The lobe 15 is then in or close to actual abutment with the pin 6 and remains in such end position until the operator releases the handle 18*a*. In the embodiment of FIGS. 1 and 2, the angular distance between the arresting pins 6, 6*a* is a little more than 90 degrees. When the lobe 15 abuts against the pin 6, the face 3*c* of the tone arm 3 is disengaged from the contact face 8 whereby the spring 11 or 111 automatically returns the tone arm to its starting position in which the needle 3*b* registers with the outermost convolution (lead-in portion) of the sound groove. A suitable stop member 9 on the partition 10 arrests the tone arm 3 in such starting position. The partition 10 has two cutouts 24, 25 for the needle 3*b* and stop 14.

When the handle 18*a* is released, the torsion spring of the spring motor begins to dissipate energy and rotates the reel 22 and turntable 21 in a clockwise direction, as viewed in FIG. 2. The cam 5 participates in such rotation until the lobe 15 returns into engagement with the arresting pin 6*a*. The lever 4 follows the bias of its spring 17 and moves its free end portion 4*a* away from the stop 14 and along the cam surface 13 so that the spring 11 or 211 can shift the tone arm 3 in a direction toward the contact element 7 whereby the face 3*c* is wedged against the face 8 and the tone arm transmits all of its vibrations to the diaphragm 1. The spring 11 or 111 is too weak to prevent the needle 3*b* from tracking the sound groove in the record carrier 2 so that the needle travels in the cutout 24 radially toward the shaft 19 and ultimately reaches the innermost convolution (terminal portion) of the sound groove upon completed reproduction of the entire sound sequence.

It is to be noted that the spring 11 or 211 automatically moves the tip of the needle 3*b* into the outermost convolution of the sound groove when the lever 4 returns into abutment with the pin 6 because the contact face 3*c* slides along the downwardly inclined contact face 8 and moves the needle substantially axially toward the exposed surface of the record carrier 2.

The drawstring 18 performs a series of important functions, namely, it energizes the spring motor by winding the torsion spring when the handle 18*a* is moved outwardly, it automatically arrests the turntable 21 when the handle 18*a* reaches the outer side of the housing 20, it causes the cam 5 to effect movement of the needle 3*b* away from the grooved exposed surface of the record carrier 2 during winding of the torsion spring, it enables the spring 11 or 111 to return the needle into registry with the outermost convolution of the sound groove in automatic response to retraction of the face 3*c* from engagement with the face 8, and it also enables the spring 11 or 211 to move the needle axially into the outermost convolution of the sound groove when the torsion spring is allowed to dissipate energy. The quality of sound reproduction is surprisingly satisfactory because the inclined contact face 8 compels the needle 3*b* to remain in engagement with the record carrier. This is of particular importance when the apparatus of the present invention is embodied in a doll or in or on another toy device which might be subjected to rough treatment. The apparatus is very simple and occupies little room so that it can be readily installed in or on relatively small toy devices.

Figures 4, 5, 6, 7:
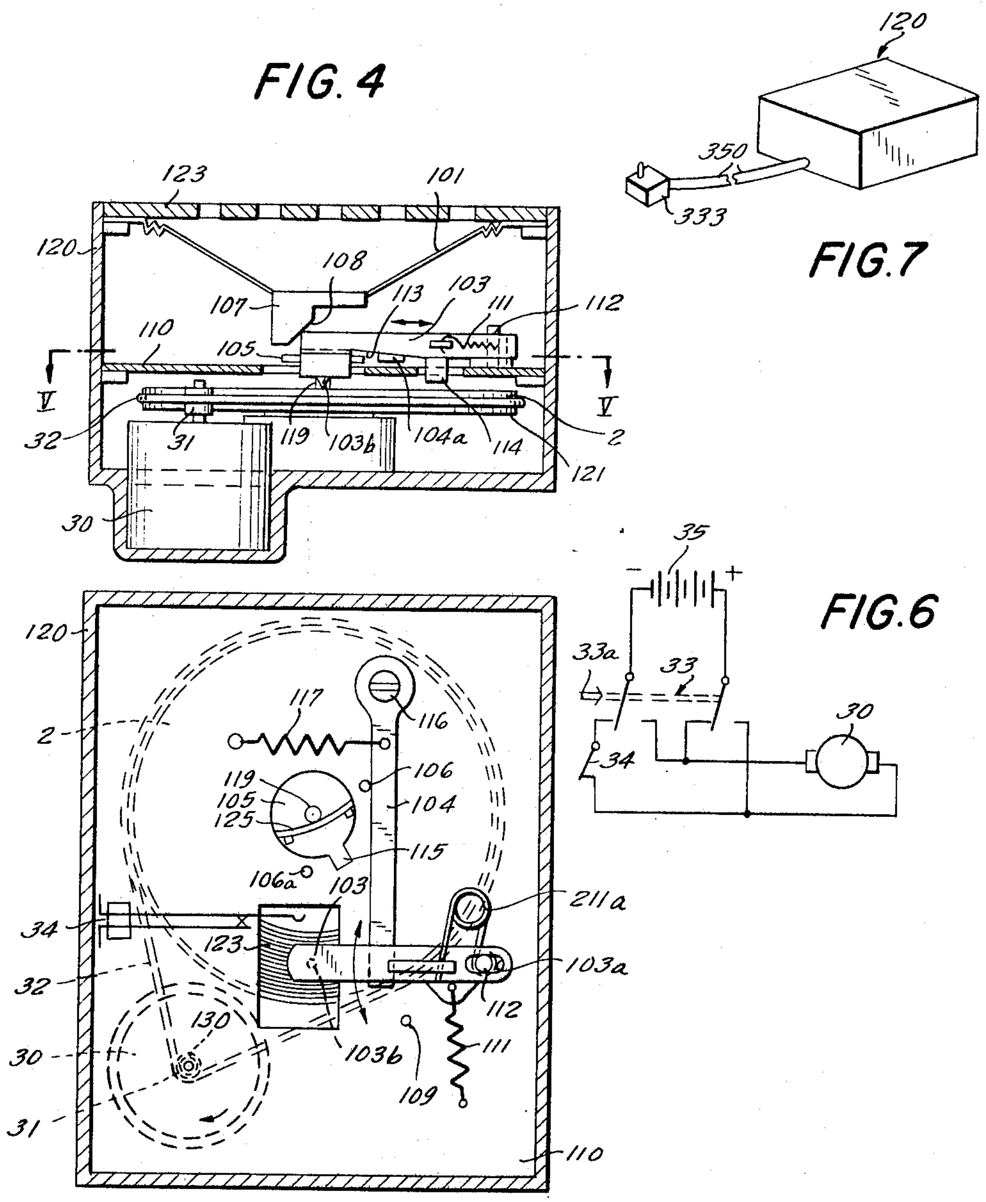
FIG. 4 is a transverse vertical sectional view of a third sound reproducing apparatus wherein the record carrier is driven by an electric motor.
FIG. 5 is a horizontal section as seen in the direction of arrows from the line V—V of FIG. 4.
FIG. 6 is a diagrammatic view of the electric circuit in the apparatus of FIGS. 4 and 5.
FIG. 7 is a scehmatic perspective view of a fourth apparatus wherein the operation of the motor can be reversed by remote control.

FIGS. 4–6 illustrate a second embodiment of the sound reproducing apparatus wherein the prime mover for the turntable 121 of the disk-shaped record carrier 2 comprises a reversible electric motor 30. The sound groove of the record carrier 2 is shown at 123. The turntable 121 has a peripheral groove which receives an endless belt 32. The belt 32 is further trained around a pulley 31 mounted on the output shaft 130 of the motor 30. The partition 110 of the housing 120 carriers a pivot pin 112 for the tone arm 103. The latter's right-hand end has an elongated slot 103*a* which receives the pin 112. The left-hand end of the tone arm 103 carries a needle or stylus 103*b*. The tone arm 103 is biased by two springs 111, 211*a* substantially in the same way as described in connection with FIG. 3.

The diaphragm 101 is mounted on the top wall 123 in the same way as the diaphragm 1 of FIGS. 1 and 2 and carries a contact element 107 having an inclined face 108 which can be engaged by the complementary face at the left-hand end of the tone arm 103.

When the apparatus is in use, the output shaft 130 of the motor 30 drives the pulley 31 in a clockwise direction, as viewed in FIG. 5, so that the turntable 121 rotates in the same direction and drives the record carrier 2. The latter can form an integral part of the turntable 121. The spring 211*a* urges the left-hand end of the tone arm 103 against the face 108 of the contact element 107 so that the tip of the needle 103*b* is compelled to track the sound groove 123. The motion transmitting cam 105 rotates with the shaft 119 of the turntable 121 until its lobe 115 engages the arresting pin 106*a* on the partition 110. A friction clutch 125 then allows the shaft 119 to rotate with reference to the cam 105. In the embodiment of FIGS. 4–6, the clutch 125 comprises a leaf spring whose ends are affixed to the cam 105 and a median portion of which bears against the shaft 119.

When the needle 103*b* reaches the innermost convolution of the sound groove 123, the tone arm 103 opens a normally closed stop switch 34. The latter then opens or deenergizes the electric circuit of the motor 30 so that the turntable 121 comes to a halt. The circuit diagram of the motor 30 is shown in FIG. 6. This diagram further shows a reversing switch 33 which normally assumes the position shown in FIG. 6 in which it causes the motor 30 to rotate the turntable 121 in a clockwise direction as soon as the stop switch 34 is permitted to close. The switch 33 has a pushbutton 33*a* which can be depressed by hand so as to reverse the connection between the motor 30 and the source 35 of electrical energy whereby the motor drives the turntable 121 in a counterclockwise direction. The reversing switch 33 then bridges the switch 34 so that the latter cannot prevent the flow of current in the circuit including the parts 33, 30 and 35. The source 35 is preferably constituted by one or more replaceable or rechargeable batteries.

When the pushbutton 33*a* of the reversing switch 33 is depressed and the turntable 121 rotates in a counterclockwise direction, as viewed in FIG. 5, its shaft 119 rotates the cam 105 through the intermediary of the friction clutch 125 until the lobe 115 of the cam 105 reaches the arresting pin 106 on the partition 110. During travel from the pin 106*a* toward the pin 106, the lobe 115 turns the lifting lever 104 in a counterclockwise direction whereby the follower 104*a* of the lever 104 travels along the cam surface 113 and engages the stop 114 of the tone arm 103 to shift the latter lengthwise along the pivot pin 112 so as to move the left-hand end of the tone arm away from the face 108 of the contact element 107. The spring 211*a* stores energy but the spring 111 is free to move the needle 103*b* into registry with the outermost convolution of the sound groove 123. It is to be noted that, during travel along the cam surface 113, the follower 104*a* of the lever 104 lifts the needle 103*b* above and away from the exposed grooved surface of the record carrier 2 so that the spring 111 can readily turn the tone arm 103 about the pivot pin 112. The angular movement of the lobe 115 is terminated when it abuts against the arresting pin 106, i.e., after the cam 105 completes about one-fourth of a full revolution. The tone arm 103 comes to a halt when it abuts against the stop member 109 on the partition 110, namely, when the needle **103*b* registers with the outermost convolution of the sound groove 123**.

The operator thereupon releases the pushbutton **33*a* whereby the reversing switch 33 reassumes the position shown in FIG. 6. The stop switch 34 is closed because the tone arm 103 has been returned to starting position (abutment with the stop member 109) so that the motor 30 automatically drives the turntable 121 in a clockwise direction and the needle 103*b* tracks the sound groove 123 to again reproduce the entire sound sequence. When the motor 30 begins to drive the turntable 121 in a clockwise direction (in response to release of the reversing switch 33), the shaft 119 turns the cam 105 in a clockwise direction, as viewed in FIG. 5, so that the lobe 115 moves away from the lever 104 and the latter is free to follow the bias of the spring 117 to turn about the pivot 116. The follower 104*a* moves away from the stop 114 and allows the spring 211*a* to shift the tone arm 103 in a direction to the left, as viewed in FIG. 5, in order to bias the left-hand end of the tone arm against the face 108 of the contact element 107 and to simultaneously move the needle 103*b* into the outermost convolution of the sound groove 123. The cam 105 is arrested when its lobe 115 reaches the arresting pin 106*a*. The friction clutch 125 then allows the shaft 119 to rotate with the turntable 121 and record carrier 2 independently of the cam 105**.

An important advantage of the apparatus shown in FIGS. 4–6 is that it can reproduce a single sound sequence or a series of sound sequences of considerable length. In other words, the housing 120 can accommodate a long-playing record carrier since the period of time during which the motor 30 can drive the record carrier depends solely on the size of the motor and the capacity of the battery 35 to store and furnish electrical energy. The length of sound sequences which can be reproduced in the apparatus of FIGS. 1 and 2 is limited by the fact that the spring motor is energized by a drawstring whose length cannot be increased at will, particularly in a toy device. Of course, the drawstring 18 could be replaced by a rewinding key or another suitable energizing device.

It will be seen that, in each embodiment of my sound reproducing apparatus, the needle **3*b* or 103*b* is automatically disengaged from the record carrier 2 in response to a reversal in the direction of rotation of a portion (22 or 130) of the prime mover for the record carrier. Furthermore, such reversal in the direction of rotation preferably initiates automatic return movement of the needle 3*b* or 103*b* into registry with the outermost convolution of the sound groove in the record carrier. In the embodiment of FIGS. 1 and 2, the reversal in the direction of rotation of the shaft 19 takes place in response to withdrawal of the drawstring 18. In the embodiment of FIGS. 4–6, such reversal is caused by depression of the pushbutton 33*a* on the switch 33 which results in a change of the connection between the motor 30 and battery 35. It is clear that the sound reproducing apparatus of FIGS. 4–6 can be operated by remote control, for example, by connecting the switch 333 (FIG. 7) in the circuit of the motor 30 by a flexible cable 350 containing a set of elongated conductors so that the person operating the sound reproducing apparatus can hold and actuate the switch 333 at a desired distance from the housing 120**.

It is further clear that the sound reproducing apparatus is capable of use in all kinds of talking dolls or other types of toys as well as in regular record players wherein the tone arm might but need not return to starting position after its needle has completed the tracking of a sound sequence.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a sound reproducing apparatus, a combination comprising a frame; a record carrier rotatably supported by said frame and having an exposed surface provided with a sound groove; a tone arm mounted on said frame and having a needle arranged to track said sound groove; rotatable drive means arranged to drive said record carrier while rotating in a first direction but being rotatable also in opposite direction; lifting means movably mounted on said frame and engageable with said tone arm to move the needle away from said record carrier in response to movement of said lifting means in one direction; and motion-transmitting means actuated by said rotatable drive means during rotation thereof in said opposite direction and moving said lifting means in said one direction so as to move the needle away from said record carrier.

2. A combination as defined in claim 1, wherein said lifting means comprises a lifting member pivoted to said frame and having follower means engageable with said tone arm to move the needle away from said record carrier in response to pivoting of said lifting member in said one direction.

3. A combination as defined in claim 2, wherein said motion transmitting means comprises rotary cam means and friction clutch means connecting said cam means with said drive means, said cam means having a portion engaging said lifting member to pivot the same in said one direction in response to operation of said drive means in said opposite direction.

4. A combination as defined in claim 3, further comprising a pair of arresting means for limiting rotation of said cam means between two end positions in one of which said lifting member maintains the needle away from said record carrier and in the other of which the lifting member allows the needle to engage the record carrier.

5. A combination as defined in claim 2, wherein said tone arm comprises a cam surface which is tracked by said follower means and stop means engaged by said lifting member during movement in said one direction to move said tone arm substantially tangentially of said record carrier.

6. A combination as defined in claim 5, wherein said stop means is adjacent to said cam surface and wherein said cam surface cooperates with said follower means to disengage said needle from said sound groove prior to engagement between said lifting member and said stop means.

7. A combination as defined in claim 1, further comprising means for resetting said needle from a terminal portion of the sound groove to a lead-in portion of the sound groove in response to lifting of the tone arm by said lifting means.

8. A combination as defined in claim 7, wherein said resetting means comprises means for permanently biasing said tone arm in a direction to place said needle into registry with the lead-in portion of said sound groove.

9. A combination as defined in claim 1, wherein said drive means comprises a spring motor energizable to operate in said first direction, and energizing means arranged to operate said motor in said opposite direction.

10. A combination as defined in claim 1, wherein said drive means comprises a reversible electric motor and means for reversing the rotation of said motor.

11. A combination as defined in claim 10, wherein said reversing means comprises electric switch means.

12. A combination as defined in claim 10, wherein said drive means further comprises a shaft arranged to rotate said record carrier and a transmission connecting said shaft with said motor, said lifting means receiving motion from said shaft.

13. A combination as defined in claim 12, wherein said transmission is a belt transmission.

14. A combination as defined in claim 10, wherein said drive means further comprises normally closed electric switch means connected in series with said motor and opening in response to engagement of said needle with a terminal portion of said sound groove.

15. A combination as defined in claim 14, wherein said electric switch means extends into the path of and is actuated by said tone arm when the needle reaches the terminal portion of said sound groove.

16. A combination as defined in claim 14, wherein said drive means further comprises a source of electrical energy connected with said motor and further comprising second switch means, said motor being of the reversible polarity type and said second switch means being movable to and from a position in which it reverses the polarity of said motor.

17. A combination as defined in claim 16, wherein the first mentioned electric switch means is connected in series with the circuit energized in said position of said second switch means.

18. A combination as defined in claim 11, wherein said electric switch means is remote from said frame and said drive means further comprises flexible conductor means connecting said switch means in circuit with said motor.

19. A combination as defined in claim 10, where said drive means further comprises battery means for supplying electrical energy to said motor means.

20. A combination as defined in claim 1, further comprising diaphragm means mounted in said frame and including a contact element having a contact face inclined with reference to the exposed surface of said record carrier and means for biasing said tone arm against said contact face when the needle tracks said sound groove.

References Cited

UNITED STATES PATENTS

| | | | |
|---|---|---|---|
| 2,380,037 | 7/1945 | Franck et al. | 274—14 |
| 3,165,320 | 1/1965 | Ryan | 274—9 X |
| 3,186,717 | 6/1965 | Vuyosevich et al. | 274—1 |
| 3,411,790 | 11/1968 | Suchowski | 274—1.1 |

HARRY N. HAROIAN, Primary Examiner

U.S. Cl. X.R.

274—15